US011984307B2

(12) United States Patent
Smith

(10) Patent No.: US 11,984,307 B2
(45) Date of Patent: May 14, 2024

(54) METHOD FOR TUNING WITH UNRESOLVED PEAKS ON QUADRUPOLE MASS SPECTROMETERS

(71) Applicant: THERMO FINNIGAN LLC, San Jose, CA (US)

(72) Inventor: Johnathan W. Smith, Austin, TX (US)

(73) Assignee: Thermo Finnigan LLC, San Jose, CA (US)

( * ) Notice: Subject to any disclaimer, the term of this patent is extended or adjusted under 35 U.S.C. 154(b) by 118 days.

(21) Appl. No.: 17/578,371

(22) Filed: Jan. 18, 2022

(65) Prior Publication Data

US 2023/0230824 A1 Jul. 20, 2023

(51) Int. Cl.
*H01J 49/42* (2006.01)
*H01J 49/00* (2006.01)

(52) U.S. Cl.
CPC ...... *H01J 49/0036* (2013.01); *H01J 49/0009* (2013.01); *H01J 49/42* (2013.01)

(58) Field of Classification Search
CPC ..... H01J 49/0036; H01J 49/0009; H01J 49/42
USPC .................................................. 250/281, 282
See application file for complete search history.

(56) References Cited

U.S. PATENT DOCUMENTS 7,767,960 B2 * 8/2010 Makarov ............... H01J 49/425 250/281
9,177,765 B2 * 11/2015 Olney ................. H01J 49/0009
2016/0181076 A1 * 6/2016 Smith ................. H01J 49/0009 702/104
2021/0111013 A1 * 4/2021 Quarmby ............ H01J 49/4295

FOREIGN PATENT DOCUMENTS

EP 3806133 A1 4/2021

OTHER PUBLICATIONS

Ferry, Mark A, "Environmental Consulting & Supplies Tuning for Agilent GC/ MS Systems", Jan. 1, 2016, 17 pages, Retrieved from the Internet: URL:https://www.spex.com/getmedia/a26ee57f-3ab2-4619-96ce•e87ab3038374/Optimize_Issue_ 1 _January_2016.pdf?ext=. pdf, retrieved on Jun. 1, 2023.
Grothe, Rob, "Mass and Resolution Calibration for New Triple-Stage Quadrupole Mass Spectrometers", Jan. 1, 2013, Retrieved from the Internet: URL:http://tools.thermofisher.com/content/sfs/posters/PN-ASMS13-Th095-Resolution-and-Mass-Calibration-Quantiva-Endura-RGrothe.pdf, retrieved on Feb. 1, 2018.

* cited by examiner

*Primary Examiner* — Michael Maskell

(57) ABSTRACT

A mass spectrometer support apparatus includes a peak shape logic to determine one or more peak shapes using a calibration mass spectrum and known peak locations; and a tuning logic to adjust instrument parameters to achieve a selected peak width. A method for tuning a quadrupole-based mass spectrometer includes determining one or more peak shapes using a calibration mass spectrum and known peak locations; and adjusting instrument parameters to achieve a selected peak width.

11 Claims, 6 Drawing Sheets

METHOD FOR TUNING WITH UNRESOLVED PEAKS ON QUADRUPOLE MASS SPECTROMETERS

FIELD

The present disclosure generally relates to the field of mass spectrometry including systems and methods for tuning with unresolved peaks on quadrupole mass spectrometers.

INTRODUCTION

Quadrupole based mass spectrometers need to be tuned in a calibration step to produce peak widths that are of a known width in order to make useful data spectra. This can be complicated by the presence of isotope masses at higher masses as well as by contamination masses that may lie close to the calibration masses. The isotope problem tends to limit the maximum peak width that can be tuned for at higher masses due to the peaks overlapping while contamination causes occasional tune errors.

SUMMARY

In a first aspect, a mass spectrometer support apparatus can include peak shape logic to determine one or more peak shapes using a calibration mass spectrum and known peak locations; and tuning logic to adjust instrument parameters to achieve a selected peak width.

In various embodiments of the first aspect, the one or more peaks shapes can include a first peak shape for low mass ions and a second peak shape for high mass ions.

In various embodiments of the first aspect, the peak shape logic and the tuning logic can be implemented by a common computing device.

In various embodiments of the first aspect, at least one of the peak shape logic and the tuning logic can be implemented by a computing device remote from the scientific instrument.

In various embodiments of the first aspect, at least one of the peak shape logic and the tuning logic can be implemented by a user computing device.

In various embodiments of the first aspect, least one of the peak shape logic and the tuning logic can be implemented in the scientific instrument.

In various embodiments of the first aspect, the tuning logic can adjust the peak width by adjusting the RF and DC voltage ramp rates of a mass resolving quadrupole.

In various embodiments of the first aspect, the mass spectrometer support system further includes a calibration logic to adjust instrument parameters to match the peaks locations of a calibration mass spectrum to known mass-to-charge ratios for a calibration standard.

In various embodiments of the first aspect, the peak shape logic can include a convex optimization solver.

In a second aspect, a method for tuning a quadrupole-based mass spectrometer can include determining one or more peak shapes using a calibration mass spectrum and known peak locations; and adjusting instrument parameters to achieve a selected peak width.

In various embodiments of the second aspect, the one or more peaks shapes can include a first peak shape for low mass ions and a second peak shape for high mass ions.

In various embodiments of the second aspect, adjusting the peak width can include adjusting the RF and DC voltage ramp rates of a mass resolving quadrupole.

In various embodiments of the second aspect, the method can further include adjusting instrument parameters to match the peaks locations of a calibration mass spectrum to known mass-to-charge ratios for a calibration standard.

In various embodiments of the second aspect, the determining an average peak shape can include solving a convex optimization problem.

In various embodiments, one or more non-transitory computer readable media can have instructions thereon that, when executed by one or more processing devices of a scientific instrument support apparatus, cause the scientific instrument support apparatus to perform the method of the second aspect.

In a third aspect, a mass spectrometer support apparatus can include deconvolving logic to obtain a mass spectrum measured by a mass spectrometer and deconvolve the spectrum using an initial peak shape, the initial peak shape previously determined when tuning a mass spectrometer; and centroider logic to integrate the deconvolved spectrum and populate a sparse vector of peak locations, and peak recovery logic to obtain an updated peak shape, and diagnostic logic to compare the updated peak shape to the initial peak shape and determine the mass spectrometer is in a suboptimal state when a deviation between the updated peak shape and the initial peak shape crosses a threshold.

In various embodiments of the third aspect, the deconvolving logic, the centroider logic, the peak recovery logic, and the diagnostic logic can be implemented by a common computing device.

In various embodiments of the third aspect, at least one of the deconvolving logic, the centroider logic, the peak recovery logic, and the diagnostic logic can be implemented by a computing device remote from the scientific instrument.

In various embodiments of the third aspect, at least one of the deconvolving logic, the centroider logic, the peak recovery logic, and the diagnostic logic can be implemented by a user computing device.

In various embodiments of the third aspect, least one of the deconvolving logic, the centroider logic, the peak recovery logic, and the diagnostic logic can be implemented in the scientific instrument.

In various embodiments of the third aspect, the diagnostic logic can further notify a user when the mass spectrometer is determined to be in the suboptimal state.

In various embodiments of the third aspect, the diagnostic logic can further trigger a tuning procedure when the mass spectrometer is determined to be in the suboptimal state.

In a fourth aspect, a method for monitoring mass spectrometer system performance can include obtaining a mass spectrum measured by a mass spectrometer; deconvolving the spectrum using an initial peak shape, the initial peak shape previously determined when tuning a mass spectrometer; integrating the deconvolved spectrum; populating a sparse vector of peak locations; obtaining an updated peak shape; and compare the updated peak shape to the initial peak shape to determine when the mass spectrometer is in a suboptimal state when a deviation between the updated peak shape and the initial peak shape crosses a threshold.

In various embodiments of the fourth aspect, the diagnostic logic can further notify a user when the mass spectrometer is determined to be in the suboptimal state.

In various embodiments of the fourth aspect, the diagnostic logic can further trigger a tuning procedure when the mass spectrometer is determined to be in the suboptimal state.

In various embodiments, one or more non-transitory computer readable media can have instructions thereon that, when executed by one or more processing devices of a scientific instrument support apparatus, cause the scientific instrument support apparatus to perform the method of the fourth aspect.

DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
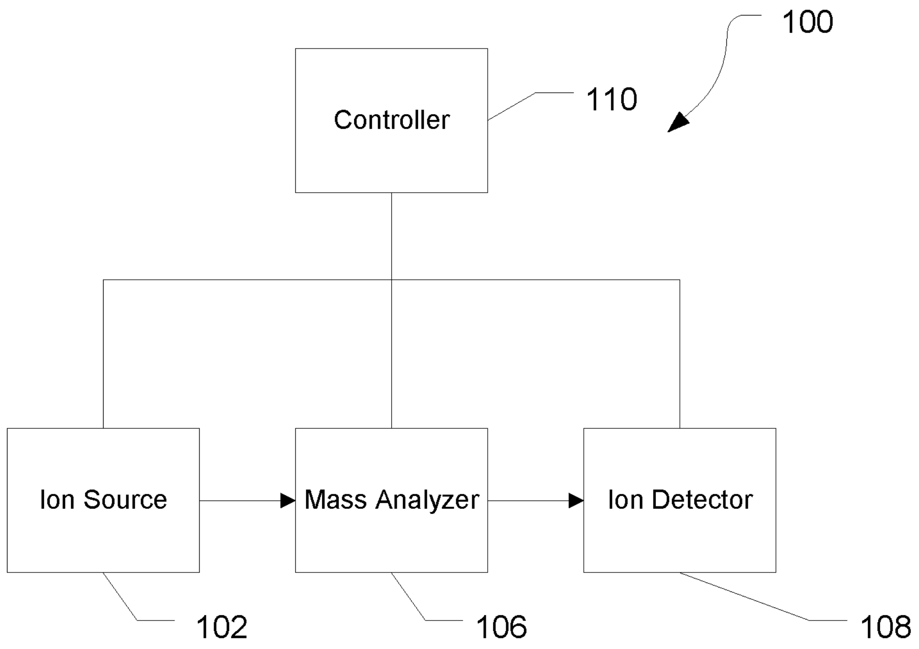
FIG. 1 is a block diagram of an exemplary mass spectrometry system, in accordance with various embodiments.

Disclosed herein are mass spectrometry systems, as well as related methods, computing devices, and computer-readable media.

The mass spectrometry embodiments disclosed herein may achieve improved performance relative to conventional approaches. In various embodiments, traditional quadrupole-based mass spectrometer data has required that the data be split apart and each mass to charge peak integrated and then assigned a single mass, often referred to as centroiding. Centroiding divides data up, integrates data around a single ion species, and assigns it all a single mass. The existing way that this process happens is by identifying valleys between the various ion species and then dividing data up. This process fails entirely if there are no valleys and has many integration errors if the peaks have substantial tails on them. All of these problems and more are addressed by taking a new approach based on ion species sparsity to create a centroider.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device or collection of devices. The drawings are not necessarily to scale.

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 106, an ion detector 108, and a controller 110.

In various embodiments, the ion source 102 generates a plurality of ions from a sample. The ion source can include, but is not limited to, an electron ionization (EI) source, a chemical ionization (CI) source, and the like.

In various embodiments, the mass analyzer 106 can separate ions based on a mass-to-charge ratio of the ions. For example, the mass analyzer 106 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 106 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio. In various embodiments, the mass analyzer 106 can be a hybrid system incorporating one or more mass analyzers and mass separators coupled by various combinations of ion optics and storage devices. For example, a hybrid system can a linear ion trap (LIT), a high energy collision dissociation device (HCD), an ion transport system, and a TOF.

In various embodiments, the ion detector 108 can detections. For example, the ion detector 108 can include an electron multiplier, a Faraday cup, and the like. Ions leaving the mass analyzer can be detected by the ion detector. In various embodiments, the ion detector can be quantitative, such that an accurate count of the ions can be determined. In various embodiments, such as with an electrostatic trap mass analyzer, the mass analyzer detects the ions, combining the properties of both the mass analyzer 106 and the ion detector 108 into one device.

In various embodiments, the controller 110 can communicate with the ion source 102, the mass analyzer 106, and the ion detector 108. For example, the controller 110 can configure the ion source 102 or enable/disable the ion source 102. Additionally, the controller 110 can configure the mass analyzer 106 to select a particular mass range to detect. Further, the controller 110 can adjust the sensitivity of the ion detector 108, such as by adjusting the gain. Additionally, the controller 110 can adjust the polarity of the ion detector 108 based on the polarity of the ions being detected. For example, the ion detector 108 can be configured to detect positive ions or be configured to detected negative ions.

Figure 2:
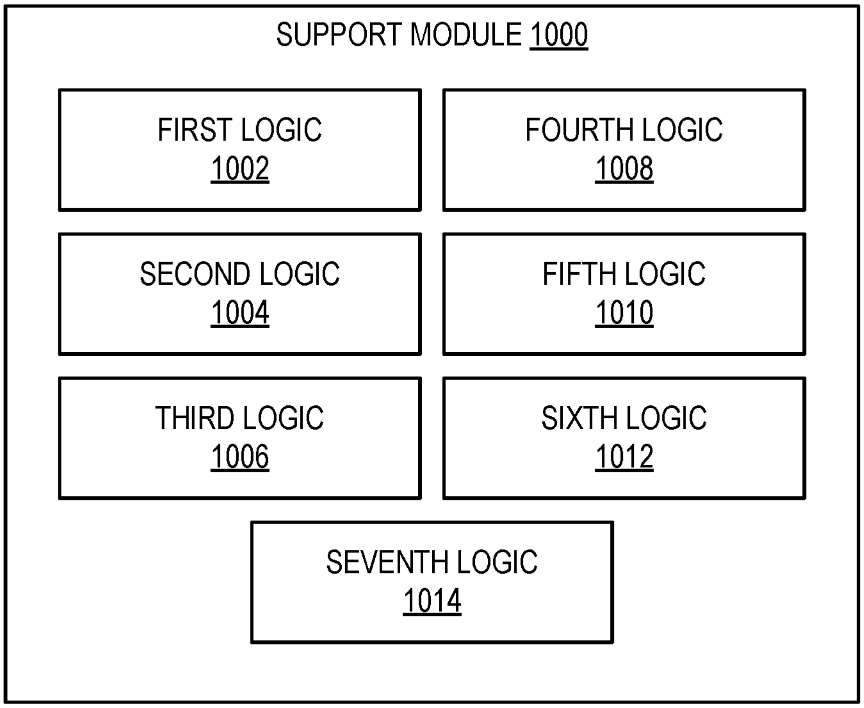
FIG. 2 is a block diagram of an example mass spectrometry support module for performing support operations, in accordance with various embodiments.

FIG. 2 is a block diagram of a mass spectrometry support module 1000 for performing support operations, in accordance with various embodiments. The mass spectrometry support module 1000 may be implemented by circuitry (e.g., including electrical and/or optical components), such as a programmed computing device. The logic of the mass spectrometry support module 1000 may be included in a single computing device, or may be distributed across multiple computing devices that are in communication with each other as appropriate. Examples of computing devices that may, singly or in combination, implement the mass spectrometry support module 1000 are discussed herein with reference to the computing device 4000 of FIG. 7, and examples of systems of interconnected computing devices, in which the mass spectrometry support module 1000 may be implemented across one or more of the computing devices, is discussed herein with reference to the mass spectrometry support system 5000 of FIG. 8.

The mass spectrometry support module 1000 may include first logic 1002, second logic 1004, third logic 1006, fourth logic 1008, fifth logic 1010, sixth logic 1012, and seventh logic 1014. As used herein, the term "logic" may include an apparatus that is to perform a set of operations associated with the logic. For example, any of the logic elements included in the mass spectrometry support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices.

The first logic 1002 may adjust instrument parameters to match the peaks locations of a calibration mass spectrum to known mass-to-charge ratios for a calibration standard. In various embodiments, a calibration mix can be ionized by the mass spectrometer and the resulting ions can be analyzed. The calibration mix is a known compound or set of compounds and the mass-to-charge ratios are known for the ions produced by ionization of the known compounds. The first logic 1002 can adjust the position of the apex of each of the mass peaks by adjusting the RF amplitude. This can ensure that the peaks are all at the accurate position in the mass spectrum for one or more mass resolving quadrupoles.

The second logic 1004 may determine one or more peak shapes using the mass spectrum and the peak locations. In various embodiments, the peak shape can be determined based on knowledge of the relative masses and intensities of the isotopes in question. With this set of information, it is possible to solve a convex optimization problem that recovers a best match peak shape for the set of isotopes in the spectra. Alternatively, other mathematical techniques, such as least squares, can be used to solve for the best match peak shape. In various embodiments, μ is the true (noise free) signal vector, y is the vector containing the single peak shape, Y is the toeplitz matrix constructed from the y vector, x is the peak selection vector. These are related by Equation 1.

$$Y*x=\mu \qquad \text{Equation 1}$$

In various embodiments, such as when recovering a peak shape from a calibration spectrum, x is known. In other embodiments, the peak selection vector can be determined by taking the centroids of the peaks in the mass spectrum. However, the actual measured spectra, b, can include noise from various sources. Equation 2a provides a convex optimization problem using the measure spectra b accounting for the noise.

$$\min(\|\{\Sigma_m[P_{rz(m)}(y*O^T)P_{cz(m)}]\}*x-b\|_2) \qquad \text{Equation 2a}$$

In Equation 2a, b is the actual measured signal vector, o is a vector of 1 followed be 0s, such that $y*o^T$ yields a square matrix with the y vector occupying the first column, $P_{cz}$ is the permutation matrix to rotate the columns by z columns in a matrix, and $P_{rz}$ is the permutation matrix to rotate the rows by z rows in a matrix. Equation 2a can be solved for y by convex optimization with the constraint that y is non-negative, resulting in an average peak shape for the mass spectrum.

$$\min(\|Ax-b\|) \qquad \text{Equation 2b}$$

Alternatively, Equation 2b can be used to solve for the average peak shape where A is a circulant matrix and a>=0 where a is a column of matrix A.

$$\min\|y*x-b\| \qquad \text{Equation 2c}$$

Equation 2c provides another representation replacing the matrix multiplication of Equation 2b with a convolution operation.

In various embodiments, the peak shape can be uniform across the spectra, or at least sufficiently uniform to be described by a single peak shape. In other embodiments, multiple peak shapes can be used to describe the spectra, such as different regions of the spectra may have different peaks shapes. For example, a first peak shape can be determined for low mass ions and a second peak shape can be determined for high mass ions. Additional peaks shapes can be determined for intermediate mass ions.

The third logic 1006 may adjust instrument parameters to achieve a selected peak width. In various embodiments, the width of calibrant peaks can be adjusted to the desired value by adjusting the RF and DC ramp rate of the mass resolving quadrupoles. In various embodiments, this can be done for each calibrant ion and at multiple scan rates to establish a table of ramp rates to achieve the desired resolution. In various embodiments, it may be necessary to adjust the instrument parameters, collect a new calibration mass spectrum, determine the average peak shape, and adjust parameters further until the desired peak width is achieved.

The fourth logic 1008 may deconvolve a mass spectrum measured using an approximate peak shape. For example, the fourth logic 1008 may deconvolve a mass spectrum of a sample using the approximate peak shape. In various embodiments, the fourth logic 1008 can select an initial peak shape, such as a square wave, a positive half of a sine wave, a Gaussian curve, a Lorentzian curve, or the like. In other embodiments, the fourth logic 1008 can use a previously determined peak shape as the approximate peak shape. In some instances, the previously determined peak shape can be determined during tuning of the mass spectrometer.

In various embodiments, the fourth logic 1008 can form a matrix A as a Toeplitz matrix from a vector y containing the approximate peak shape. The fourth logic 1008 can solve min(||Ax−b||2), where A is a matrix of peak shapes, b is the measured spectra, and x is a deconvolution result, subject to the constraint that x is non-negative.

The fifth logic 1010 may integrate the deconvolved spectrum and populate a sparse vector of peak locations. The fifth logic 1010 can locally integrate the result from the fourth logic 1008 and create a new vector, $x_{peak}$, which assigns each value to the highest point from the integration vector in the local range. The fifth logic 1010 can then solve a cardinality problem to sparsely populate a vector corresponding to the location of the peaks. In various embodiments, fifth logic 1010 can solve for a large cardinality, identifying a large number of peaks at one time. However, the computational complexity of solving a large cardinality problem can make it difficult to solve the problem in a reasonable time. In other embodiments, the cardinality problem can be solved iteratively by adding a small number of cardinality points in each iteration, such as not greater than 5 cardinality points. As each iteration is significantly less computationally complex, it can be faster to solve the the cardinality problem iteratively rather than solving for a large cardinality. In various embodiments, the fifth logic 1010 can solve the cardinality problem iteratively by using Equation 3 until the cardinality vector, c, is no longer adding peaks.

$$\min(\|A*(\mathrm{diag}(x_{peak})*(c+s))\|-b\|+\lambda\|c\|) \qquad \text{Equation 3}$$

In Equation 3, c is our cardinality vector which is allowed values are 0 or 1, J is a local integration matrix, s is the locations of the centroids and accumulates past iteration values of the cardinality vector, and $\mathrm{diag}(x_{peak})*s$ gives us the amplitude results at the correct centroid locations. In various embodiments, J enforces peaks to not be closer than the integration width. In various embodiments, Equation 3 can be subject to several constrains, such as sum(c)<=n and J*(c+s)<=1]. In various embodiments, λ=0 simplifying Equation 3.

The sixth logic 1012 may execute the, the fourth logic 1008, the fifth logic 1010 and the second logic 1004 in an iterative loop. During the iterative loop, the fourth logic 1008 can use an updated peak shape as determined by the second logic 1004 during the prior iteration. In various embodiments, the sixth logic 1012 can iterate through the loop until the peak shape determined by the second logic 1004 converges. For example, the sixth logic 1012 can determine a root mean square deviation between the current peak shape and the previous peak shape is below a threshold. In various embodiments, the sixth logic 1012 can iterate through the loop until the sparse vector of peak locations converges. In various embodiments, the sixth logic 1012 can stop iterating when a preset maximum number of iterations is reached. In some embodiments, the sixth logic 1012 can iterate until at least one of the above conditions is reached, such as iterating until the peak shape converges unless the preset maximum number of iterations is reached first.

The seventh logic 1014 may compare the updated peak shape to an initial peak shape and determine the mass spectrometer is in a suboptimal state when a deviation between the updated peak shape and the initial peak shape crosses a threshold. In various embodiments, the initial peak shape can be determined during tuning and the peak shape can be monitored during subsequent sample mass spectrum.

Tuning a quadrupole-based mass spectrometer with peak widths greater than 1 amu wide is a challenge in the presence of isotopes due to a lack of separation between adjacent masses. This tends to put more emphasis on calibration standards to not have complicated isotope distributions and generally makes it challenging to accurately tune a quadrupole mass spectrometer to wide peak widths. These wide peak widths may be advantageous for certain modes of operation such as very high scan rates or modes in triple quadrupole instruments where the Q1 is intentionally widened for a number of reasons. The isotope problem is also a particular problem for some tuning algorithms when trying to perform standard 0.7 amu width peak tuning at high masses on low-end performance instruments where the peak shape will exhibit substantial amounts of peak tailing merging adjacent masses together to some degree.

It would be preferred to have a method which could remove the isotope complication so that tuning could be confidently performed with simpler width tuning algorithms and with more confidence in the result. The true single peak shape could also be of interest to instrument health information since it would likely show a truer situation of the instrument compared with the merged result.

Figure 3:
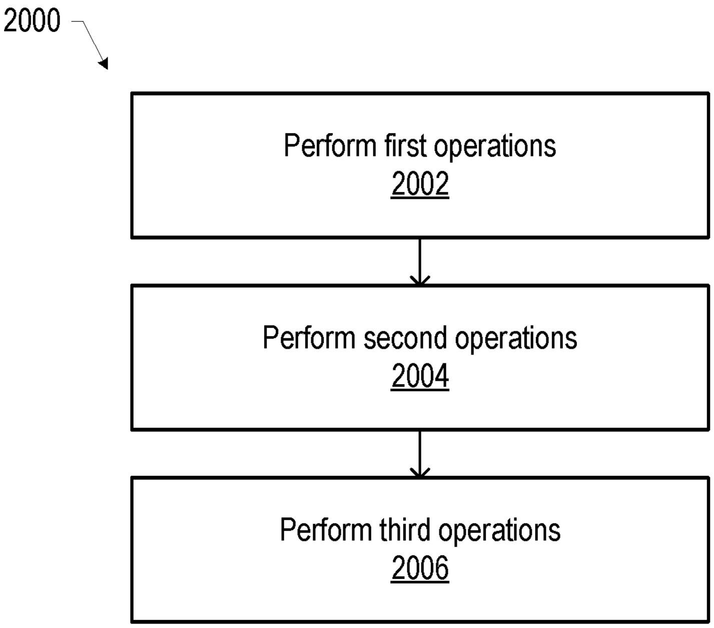
FIG. 3 is a flow diagram of an example method of tuning a quadrupole of a mass spectrometer, in accordance with various embodiments.

FIG. 3 is a flow diagram of a method 2000 of tuning a quadrupole-based mass spectrometer to achieve a desired peak width, in accordance with various embodiments. Although the operations of the method 2000 may be illustrated with reference to particular embodiments disclosed herein (e.g., the mass spectrometer support modules 1000 discussed herein with reference to FIG. 2, the GUI 3000 discussed herein with reference to FIG. 6, the computing devices 4000 discussed herein with reference to FIG. 7, and/or the mass spectrometer support system 5000 discussed herein with reference to FIG. 8), the method 2000 may be used in any suitable setting to perform any suitable support operations. Operations are illustrated once each and in a particular order in FIG. 3, but the operations may be reordered and/or repeated as desired and appropriate (e.g., different operations performed may be performed in parallel, as suitable).

At 2002, first operations may be performed. For example, the first logic 1002 of a support module 1000 may perform the operations of 2002. The first operations may include adjusting instrument parameters to match the peak locations of a calibration mass spectrum to known mass-to-charge ratios for a calibration standard. Optionally, adjusting the instrument parameters prior to determining the average peak shape, the locations of the peaks used by the second logic 1004 can be more accurate.

At 2004, second operations may be performed. For example, the second logic 1004 of a support module 1000 may perform the operations of 2004. The second operations may include determining an average peak shape using a calibration mass spectrum and known peak locations.

At 2006, third operations may be performed. For example, the third logic 1006 of a support module 1000 may perform the operations of 2006. The third operations may include adjusting instrument parameters to achieve a selected peak width.

Generally, quadrupole mass spectrometer data requires that the mass-to-charge data be divided up and centroided to obtain useful data. This process involves choosing which part of a stream of raw data belongs together, integrating that data, and assigning a single mass peak for it. This is done throughout the spectrum and the data is provided to the end user or used for further analysis.

This process is simple when the various masses are separated sufficiently by the instrument such that they do not overlap. However, in many cases, there may not be sufficient separation between the ion species in the spectrum. For example, the mass peaks may be wider than the separation between the peaks, such as the instrument only resolving each mass peak to a width of 1.5 amu but having masses that are only 1 amu apart. In another example, peak shapes may not decrease to baseline intensity rapidly, such as with peaks having a long leading or trailing transmission tail. In some cases, peaks can be differentiated finding a valley between peaks. Several techniques are known for apportioning the integrated values between the two adjacent peaks, but each is subject to integration errors due to the overlapping transmission tails. Various factors in instrument design and scanning at high scan rates can further compound the problem.

Figure 4:
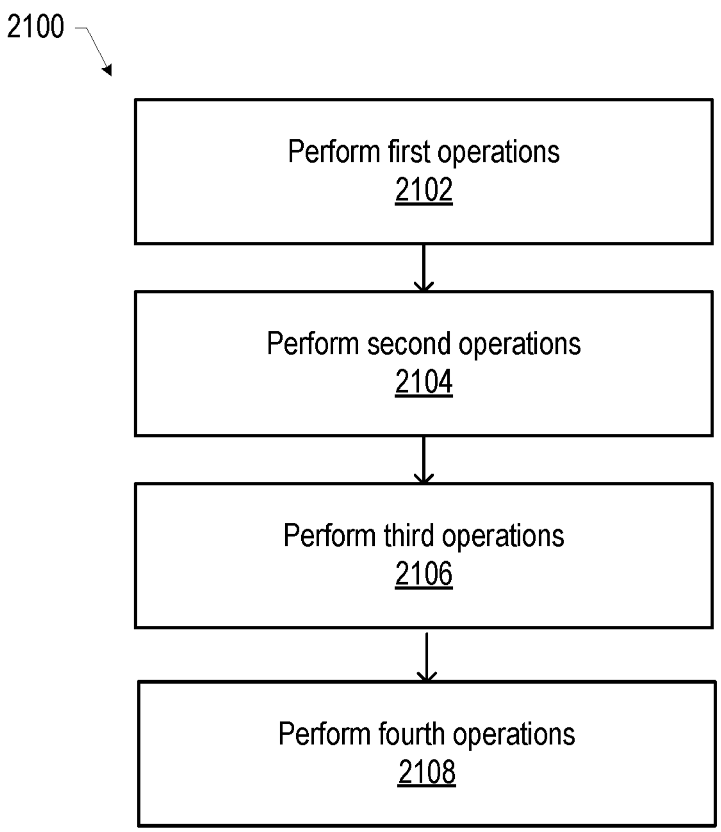
FIG. 4 is a flow diagram of an example method of tuning a quadrupole of a mass spectrometer, in accordance with various embodiments.

FIG. 4 is a flow diagram of a method 2100 of centroiding mass spectrometer data, in accordance with various embodiments. Although the operations of the method 2100 may be illustrated with reference to particular embodiments disclosed herein (e.g., the mass spectrometer support modules 1000 discussed herein with reference to FIG. 2, the GUI 3000 discussed herein with reference to FIG. 6, the computing devices 4000 discussed herein with reference to FIG. 7, and/or the mass spectrometer support system 5000 discussed herein with reference to FIG. 8), the method 2100 may be used in any suitable setting to perform any suitable support operations. Operations are illustrated once each and in a particular order in FIG. 4, but the operations may be reordered and/or repeated as desired and appropriate (e.g., different operations performed may be performed in parallel, as suitable).

At 2102, first operations may be performed. For example, the fourth logic 1008 of a support module 1000 may perform the operations of 2102. The first operations may include deconvolving a mass spectrum measured by a mass spectrometer using an approximate peak shape. In various embodiments, the starting peak shape can be selected from a library of shapes, such as a square wave, a positive half of a sine wave, a Gaussian curve, a Lorentzian curve, or the like. In other embodiments, the starting peak shape can be determined during a tuning method, such as method 2000 of FIG. 3.

At 2104, second operations may be performed. For example, the fifth logic 1010 of a support module 1000 may perform the operations of 2104. The second operations may include integrating the deconvolved spectrum and populate a sparse vector of peak locations.

Optionally, at 2106, third operations may be performed. For example, the second logic 1006 of a support module 1000 may perform the operations of 2106. The third operations may include determining an updated peak shape using the mass spectrum and the peak locations.

Optionally, at 2108, fourth operations may be performed. For example, the sixth logic 1012 of a support module 1000 may perform the operations of 2108. The third operations may include repeating the deconvolving, integrating, and shape determining until an endpoint is reached, using the determined peak shape as an updated peak shape for deconvolving during the next iteration. In various embodiments, the endpoint can include the peak shape converging within a predetermined limit, the sparse vector of peak locations converging within a predetermined limit, a preset number of iterations is reached, or any combination thereof.

In various embodiments, the maximum width of the recovered peak shape can be limited. Allowing the peak width of the recovered peak shape to exceed twice the actual width can lead to doublets being included as a single peak. In some embodiments, a mask vector can be used when initially identifying the peaks to constrain the results and limit peak widths.

Figure 5:
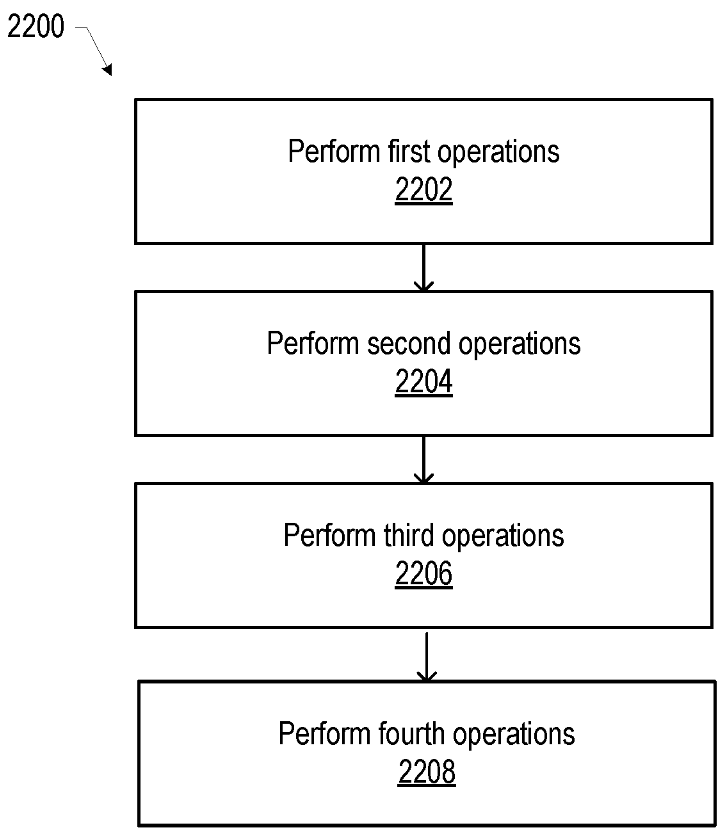
FIG. 5 is a flow diagram of an example method of monitoring the performance of a mass spectrometer system, in accordance with various embodiments.

FIG. 5 is a flow diagram of a method 2200 of monitoring mass spectrometer system performance, in accordance with various embodiments. Although the operations of the method 2200 may be illustrated with reference to particular embodiments disclosed herein (e.g., the mass spectrometer support modules 1000 discussed herein with reference to FIG. 2, the GUI 3000 discussed herein with reference to FIG. 6, the computing devices 4000 discussed herein with reference to FIG. 7, and/or the mass spectrometer support system 5000 discussed herein with reference to FIG. 8), the method 2200 may be used in any suitable setting to perform any suitable support operations. Operations are illustrated once each and in a particular order in FIG. 5, but the operations may be reordered and/or repeated as desired and appropriate (e.g., different operations performed may be performed in parallel, as suitable).

At 2202, first operations may be performed. For example, the fourth logic 1002 of a support module 1000 may perform the operations of 2202. The first operations may include deconvolving the spectrum using an initial peak shape previously determined when tuning a mass spectrometer, such as by using method 2000 of FIG. 3.

At 2204, second operations may be performed. For example, the fifth logic 1010 of a support module 1000 may perform the operations of 2204. The second operations may include integrating the deconvolved spectrum and populate a sparse vector of peak locations.

At 2206, third operations may be performed. For example, the second logic 1004 of a support module 1000 may perform the operations of 2206. The third operations may include obtaining an updated peak shape.

At 2208, fourth operations may be performed. For example, the seventh logic 1014 of a support module 1000 may perform the operations of 2208. The fourth operations may include comparing the updated peak shape to the initial peak shape and determining the mass spectrometer is in a suboptimal state when a deviation between the updated peak shape and the initial peak shape crosses a threshold. In various embodiments, the fourth operations can include notifying a user when the mass spectrometer is in the suboptimal state, such as by displaying a message, generating an sound, changing an indicator color, sending a message, such as an email, text message, push alert, or the like, to a user local computing device, or any combination thereof. In various embodiments, the fourth operations can trigger a tuning procedure, such as method 2000 of FIG. 3, when the mass spectrometer is determined to be in a suboptimal state. For example, the tuning procedure can be scheduled between the current sample analysis and the next sample analysis.

Figure 7:
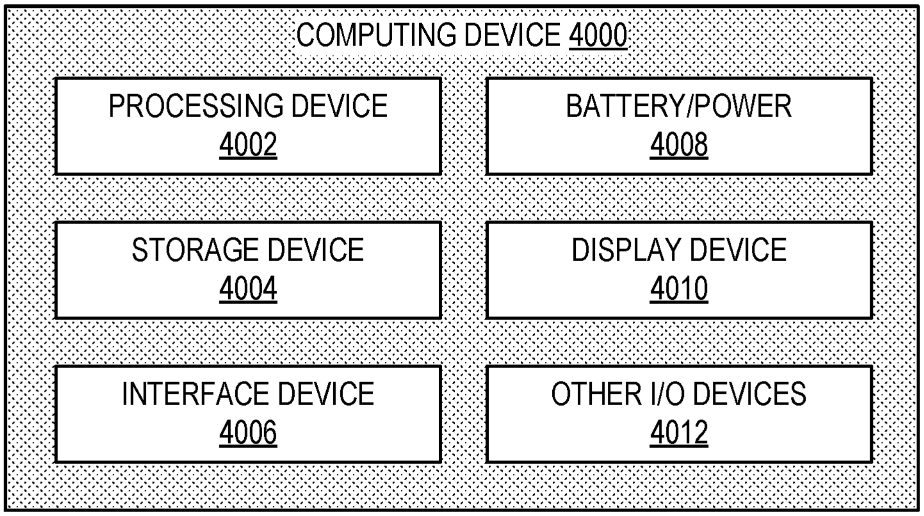
FIG. 7 is a block diagram of an example computing device that may perform some or all of the mass spectrometer support methods disclosed herein, in accordance with various embodiments.
Figure 8:
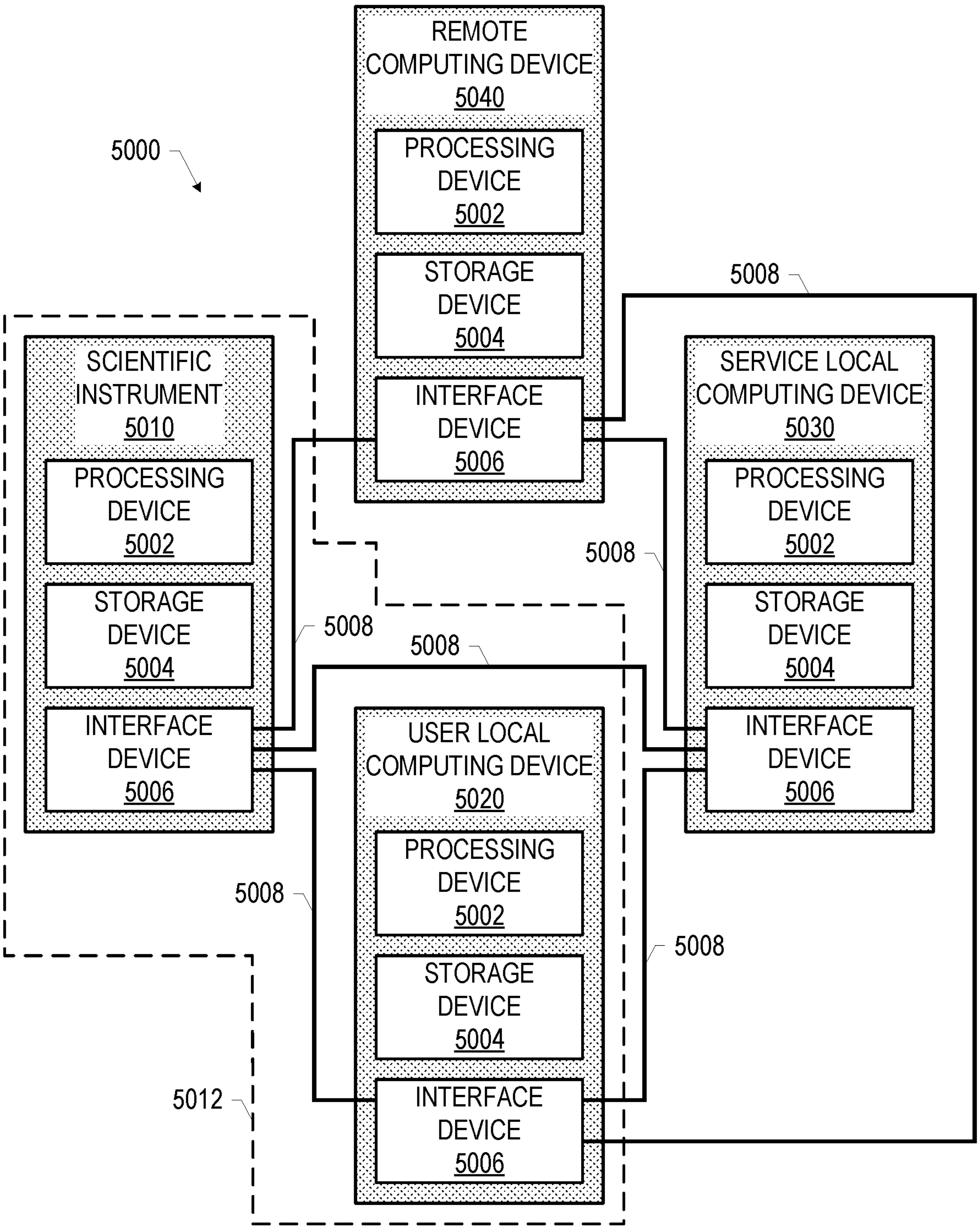
FIG. 8 is a block diagram of an example mass spectrometer support system in which some or all of the mass spectrometer support methods disclosed herein may be performed, in accordance with various embodiments.

The mass spectrometer support methods disclosed herein may include interactions with a human user (e.g., via the user local computing device 5020 discussed herein with reference to FIG. 8). These interactions may include providing information to the user (e.g., information regarding the operation of a scientific instrument such as the scientific instrument 5010 of FIG. 8, information regarding a sample being analyzed or other test or measurement performed by a scientific instrument, information retrieved from a local or remote database, or other information) or providing an option for a user to input commands (e.g., to control the operation of a scientific instrument such as the scientific instrument 5010 of FIG. 8, or to control the analysis of data generated by a scientific instrument), queries (e.g., to a local or remote database), or other information. In some embodiments, these interactions may be performed through a graphical user interface (GUI) that includes a visual display on a display device (e.g., the display device 4010 discussed herein with reference to FIG. 7) that provides outputs to the user and/or prompts the user to provide inputs (e.g., via one or more input devices, such as a keyboard, mouse, trackpad, or touchscreen, included in the other I/O devices 4012 discussed herein with reference to FIG. 7). The mass spectrometer support systems disclosed herein may include any suitable GUIs for interaction with a user.

Figure 6:
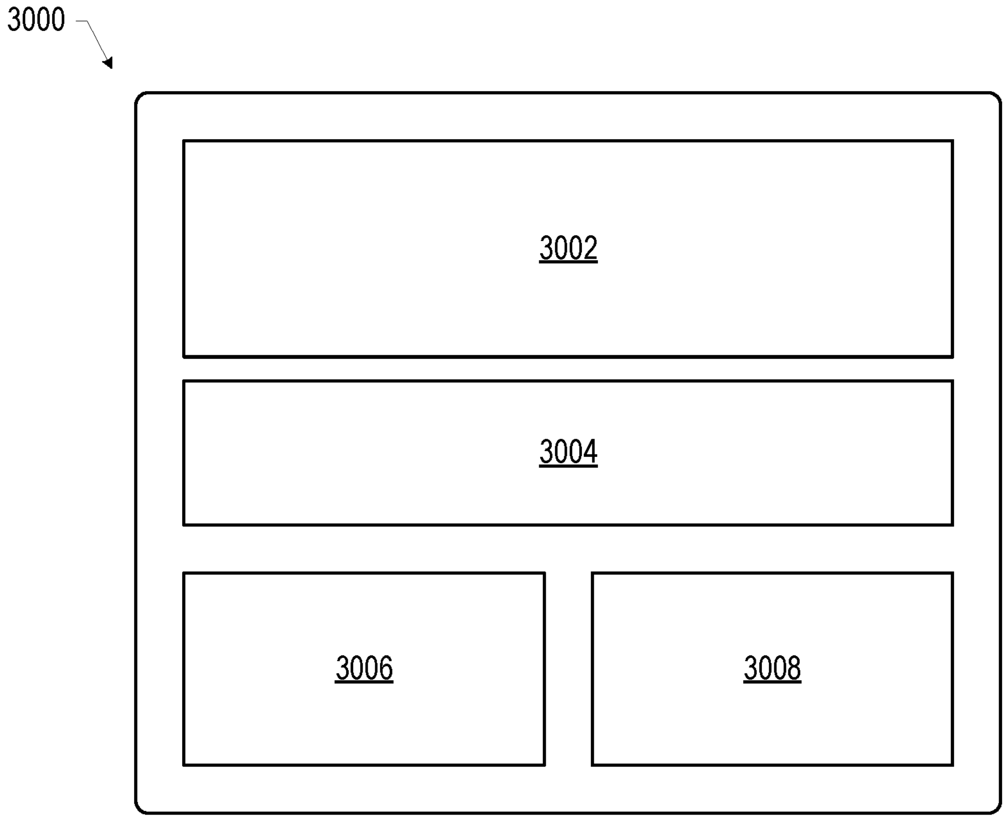
FIG. 6 is an example of a graphical user interface that may be used in the performance of some or all of the support methods disclosed herein, in accordance with various embodiments.

FIG. 6 depicts an example GUI 3000 that may be used in the performance of some or all of the support methods disclosed herein, in accordance with various embodiments. As noted above, the GUI 3000 may be provided on a display device (e.g., the display device 4010 discussed herein with reference to FIG. 7) of a computing device (e.g., the computing device 4000 discussed herein with reference to FIG. 7) of a mass spectrometer support system (e.g., the mass spectrometer support system 5000 discussed herein with reference to FIG. 8), and a user may interact with the GUI 3000 using any suitable input device (e.g., any of the input devices included in the other I/O devices 4012 discussed herein with reference to FIG. 7) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 6 is simply illustrative, and any number and arrangement of regions, including any desired features, may be included in a GUI 3000.

The data display region 3002 may display data generated by a scientific instrument (e.g., the scientific instrument 5010 discussed herein with reference to FIG. 8). For example, the data display region 3002 may display a centroided mass spectra.

The data analysis region 3004 may display the results of data analysis (e.g., the results of analyzing the data illustrated in the data display region 3002 and/or other data). For example, the data analysis region 3004 may display integrated peak intensities. In some embodiments, the data display region 3002 and the data analysis region 3004 may be combined in the GUI 3000 (e.g., to include data output from a scientific instrument, and some analysis of the data, in a common graph or region).

The scientific instrument control region 3006 may include options that allow the user to control a scientific instrument (e.g., the scientific instrument 5010 discussed herein with reference to FIG. 8). For example, the scientific instrument control region 3006 may include controls for tuning a quadrupole.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 7, sending data to another user, labeling data, etc.). For example, the settings region 3008 may include parameters for starting shape selection.

As noted above, the mass spectrometer support module 1000 may be implemented by one or more computing devices. FIG. 7 is a block diagram of a computing device 4000 that may perform some or all of the mass spectrometer support methods disclosed herein, in accordance with various embodiments. In some embodiments, the mass spectrometer support module 1000 may be implemented by a single computing device 4000 or by multiple computing devices 4000. Further, as discussed below, a computing device 4000 (or multiple computing devices 4000) that implements the mass spectrometer support module 1000 may be part of one or more of the scientific instrument 5010, the user local computing device 5020, the service local computing device 5030, or the remote computing device 5040 of FIG. 8.

The computing device 4000 of FIG. 7 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 7, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random access memory (eDRAM) or spin transfer torque magnetic random access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3 GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the mass spectrometer support modules or methods disclosed herein may be part of a mass spectrometer support system. FIG. 8 is a block diagram of an example mass spectrometer support system 5000 in which some or all of the mass spectrometer support methods disclosed herein may be performed, in accordance with various embodiments. The mass spectrometer support modules and methods disclosed herein (e.g., the mass spectrometer support module 1000 of FIG. 2, the method 2000 of FIG. 3, the method 2100 of FIG. 4, and the method 2200 of FIG. 5) may be implemented by one or more of the scientific instrument 5010, the user local computing device 5020, the service local computing device 5030, or the remote computing device 5040 of the mass spectrometer support system 5000.

Any of the scientific instrument 5010, the user local computing device 5020, the service local computing device 5030, or the remote computing device 5040 may include any of the embodiments of the computing device 4000 discussed herein with reference to FIG. 7, and any of the scientific instrument 5010, the user local computing device 5020, the service local computing device 5030, or the remote computing device 5040 may take the form of any appropriate ones of the embodiments of the computing device 4000 discussed herein with reference to FIG. 7.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 7, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 5004 discussed herein with reference to FIG. 7, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 7, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the mass spectrometer support system 5000 via communication pathways 5008. The communication pathways 5008 may communicatively couple the interface devices 5006 of different ones of the elements of the mass spectrometer support system 5000, as shown, and may be wired or wireless communication pathways (e.g., in accordance with any of the communication techniques discussed herein with reference to the interface devices 4006 of the computing device 4000 of FIG. 7). The particular mass spectrometer support system 5000 depicted in FIG. 8 includes communication pathways between each pair of the scientific instrument 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

The scientific instrument 5010 may include any appropriate scientific instrument, such as a gas chromatography mass spectrometer (GC-MS), a liquid chromatography mass spectrometer (LC-MS), ion chromatography mass spectrometer (IC-MS), or the like.

The user local computing device 5020 may be a computing device (e.g., in accordance with any of the embodiments of the computing device 4000 discussed herein) that is local to a user of the scientific instrument 5010. In some embodiments, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some embodiments, the user local computing device 5020 may be a laptop, smartphone, or tablet device. In some embodiments the user local computing device 5020 may be a portable computing device.

The service local computing device 5030 may be a computing device (e.g., in accordance with any of the embodiments of the computing device 4000 discussed herein) that is local to an entity that services the scientific instrument 5010. For example, the service local computing device 5030 may be local to a manufacturer of the scientific instrument 5010 or to a third-party service company. In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the embodiments of the computing device 4000 discussed herein) that is remote from the scientific instrument 5010 and/or from the user local computing device 5020. In some embodiments, the remote computing device 5040 may be included in a datacenter or other large-scale server environment. In some embodiments, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some embodiments, one or more of the elements of the mass spectrometer support system 5000 illustrated in FIG. 8 may not be present. Further, in some embodiments, multiple ones of various ones of the elements of the mass spectrometer support system 5000 of FIG. 8 may be present. For example, a mass spectrometer support system 5000 may include multiple user local computing devices 5020 (e.g., different user local computing devices 5020 associated with different users or in different locations). In another example, a mass spectrometer support system 5000 may include multiple scientific instruments 5010, all in communication with service local computing device 5030 and/or a remote computing device 5040; in such an embodiment, the service local computing device 5030 may monitor these multiple scientific instruments 5010, and the service local computing device 5030 may cause updates or other information may be "broadcast" to multiple scientific instruments 5010 at the same time. Different ones of the scientific instruments 5010 in a mass spectrometer support system 5000 may be located close to one another (e.g., in the same room) or farther from one another (e.g., on different floors of a building, in different buildings, in different cities, etc.). In some embodiments, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some embodiments, a scientific instrument 5010 may be sold by the manufacturer along with one or more associated user local computing devices 5020 as part of a local scientific instrument computing unit 5012.

In some embodiments, different ones of the scientific instruments 5010 included in a mass spectrometer support system 5000 may be different types of scientific instruments 5010. In some such embodiments, the remote computing device 5040 and/or the user local computing device 5020 may combine data from different types of scientific instruments 5010 included in a mass spectrometer support system 5000.

What is claimed is:

1. A mass spectrometer support apparatus, comprising:

peak shape logic to determine one or more peak shapes using a calibration mass spectrum by solving a convex optimization to recover one or more best match peak shapes for the set of isotopes in the calibration mass spectrum based on the known relative masses and intensities of the isotopes of a calibration standard; and tuning logic to adjust the peak width by adjusting the RF and DC voltage ramp rates of a mass resolving quadrupole so as to achieve a selected peak width.

2. The mass spectrometer support system of claim 1, wherein the one or more peaks shapes includes a first peak shape for low mass ions and a second peak shape for high mass ions.

3. The mass spectrometer support system of claim 1, wherein the peak shape logic and the tuning logic are implemented by a common computing device.

4. The mass spectrometer support system of claim 1, wherein at least one of the peak shape logic and the tuning logic are implemented by a computing device remote from the mass spectrometer.

5. The mass spectrometer support system of claim 1, wherein at least one of the peak shape logic and the tuning logic are implemented by a user computing device.

6. The mass spectrometer support system of claim 1, wherein at least one of the peak shape logic and the tuning logic are implemented in the mass spectrometer.

7. The mass spectrometer support system of claim 1, further comprising a calibration logic to adjust instrument parameters to match the peaks locations of a calibration mass spectrum to known mass-to-charge ratios for a calibration standard.

8. A method for tuning a quadrupole-based mass spectrometer, comprising:

determining one or more peak shapes using a calibration mass spectrum by solving a convex optimization to recover one or more best match peak shapes for the set of isotopes in the calibration mass spectrum based on the known relative masses and intensities of the isotopes of the calibration standard; and adjusting the peak width by adjusting the RF and DC voltage ramp rates of a mass resolving quadrupole so as to achieve a selected peak width.

9. The method of claim 8, wherein the one or more peaks shapes includes a first peak shape for low mass ions and a second peak shape for high mass ions.

10. The method of claim 8, further comprising adjusting instrument parameters to match the peaks locations of a calibration mass spectrum to known mass-to-charge ratios for a calibration standard.

11. One or more non-transitory computer readable media having instructions thereon that, when executed by one or more processing devices of a scientific instrument support apparatus, cause the scientific instrument support apparatus to perform the method of claim 8.

* * * * *